United States Patent [19]

Zuhn

[11] 4,019,323
[45] Apr. 26, 1977

[54] CONTROLLER FOR TURBOCHARGER SYSTEM FOR INTERNAL COMBUSTION ENGINES

[75] Inventor: Arthur A. Zuhn, E. Peoria, Ill.

[73] Assignee: Caterpillar Tractor Co., Peoria, Ill.

[22] Filed: Dec. 1, 1975

[21] Appl. No.: 636,511

[52] U.S. Cl. .................................. 60/606; 60/617; 60/619; 60/615

[51] Int. Cl.² ........................................ F02B 33/44

[58] Field of Search ............ 60/606, 605, 614, 615, 60/617, 619, 607, 611

[56] References Cited

UNITED STATES PATENTS

| | | | |
|---|---|---|---|
| 2,921,431 | 1/1960 | Sampietro | 60/605 |
| 3,096,615 | 7/1963 | Zuhn | 60/615 |
| 3,163,984 | 1/1965 | Dumont | 60/606 |

*Primary Examiner*—Ronald H. Lazarus
*Attorney, Agent, or Firm*—Phillips, Moore, Weissenberger, Lempio & Majestic

[57] ABSTRACT

The invention is concerned with an improvement in a turbocharger system for an internal combustion engine having an exhaust manifold and an intake manifold adjacent to the engine. The turbocharger system includes a turbine communicating with the exhaust manifold and driven by gases therefrom. The turbine drives a compressor and has an output which communicates with the intake manifold. A fuel burner chamber forms a part of the turbocharger system, said fuel burner chamber having an input for receiving compressed air, an output through which expanded gases pass and a spark igniter. The turbocharger system further includes means communicating the output of the compressor to the input of the fuel burner chamber, means communicating the output of the fuel burner chamber into and through the exhaust manifold, means for supplying a variable quantity of fuel from a fuel reservoir to said burner chamber and means responsive to intake manifold pressure to vary the quantity of fuel delivered to the burner. The improvement of the invention comprises means for preventing supply of said variable quantity of fuel to said burner unless said fuel is at a fuel pressure above the pressure in said burner and means responsive to said fuel being at least equal to a selectively set minimum fuel pressure value for activating said spark igniter in said burner chamber. The improvement preferably includes means responsive to intake manifold pressure for selectively shunting fuel from said fuel supplying means to said reservoir only until said intake manifold pressure is at least equal to a selectively set minimum value. Also preferably part of the improvement are means responsive to temperature of said burner chamber for deactivating said spark igniter when said temperature is at least equal to a selectively set minimum value.

7 Claims, 1 Drawing Figure

4,019,323

CONTROLLER FOR TURBOCHARGER SYSTEM FOR INTERNAL COMBUSTION ENGINES

BACKGROUND OF THE INVENTION

1. Field of the Invention

The present invention relates to turbocharger systems and more particularly to a controller for a turbocharger system which augments the performance of an internal combustion engine.

2. Prior Art

One of the limiting quantities in the performance of an internal combustion engine is the amount of air delivered to the intake manifold for the purposes of combustion in the engine cylinders. Since the amount of air necessary for proper operation of an engine is often greater than can be supplied at atmospheric pressure, it is common practice to utilize an auxiliary system for supplying additional air to the intake manifold A known means for supplying additional air to the intake manifold is a turbocharger.

A common problem associated with engines augmented by turbochargers is that the turbocharger supplies the greatest amount of compressed air when it is least needed by the engine, and the least amount of compressed air when it is most needed. This is inherent in the fact that the exhaust gases which drive the turbocharger diminish in quantity with diminishing speed of the engine. Thus, when the engine is operating at low speed, such as under heavy load, the turbocharger is driven at a slow speed and the amount of compressed air available from the compression stage is minimal. When the engine is operating at high speed, such as under low load, the quantity of exhaust gas is high, thus resulting in high speeds of the turbocharger and a large quantity of compressed air to the intake manifold. It thus becomes desirable to control a turbocharger utilized to augment the performance of an engine so as to deliver large quantities of air to the intake manifold when the engine speed is low and the air is most needed, and less air when the engine is operating at high speeds and the air requirement is not so great.

A further common problem associated with engines augmented by turbochargers and most particularly with turbochargers which utilize a burner to supply heated compressed air from the output of the turbocharger to the exhaust manifold of the internal combustion engine is in obtaining automatically controlled supply of fuel to said burner and automatic spark ignition to ignite the fuel within said burner. It is also desirable to provide control means which turn off the spark igniter once the burner has been ignited by automatic means whereby operator time is not required and operator attention is not distracted from driving, for example, a vehicle utilizing the turbocharger system including internal combustion engine. It would be highly desirable therefore to provide a means for automatically igniting the burner of a turbocharger system as described briefly above when the engine is started. It would be further advantageous if such an improvement would include means for shutting off or deactivating the spark igniter which ignites said burner when the fuel has been ignited thereby. The present invention is concerned with just such improvements.

SUMMARY OF THE INVENTION

The invention is concerned with an improvement in a turbocharger system for an internal combustion engine having an exhaust manifold and an intake manifold adjacent to the engine. A turbine communicating with the exhaust manifold and driven by gases therefrom and a compressor driven by said turbine and having an output which communicates with said intake manifold also form a part of said turbocharger system. Said turbocharger system further includes a fuel burner chamber having an input for receiving compressed air, an output through which expanded gases pass, and a spark igniter. Also part of said turbocharger are means communicating the output of said compressor to the input of said fuel burner chamber, means communicating the output of said fuel burner chamber into and through the exhaust manifold, means for supplying a variable quantity of fuel from a fuel reservoir to said burner chamber and means responsive to intake manifold pressure to vary the quantity of fuel delivered to said burner. The improvement of the invention comprises means for preventing supply of said variable quantity of fuel to said burner unless said fuel is at a fuel pressure above the pressure in said burner means responsive to the presssure of said fuel being at least equal to a selectively set minimum fuel pressure value for activating said spark igniter in said burner chamber.

BRIEF DESCRIPTION OF THE DRAWING

The invention will be better understood by reference to the drawing wherein.

DETAILED DESCRIPTION OF THE PREFERRED EMBODIMENT

Figure 1:
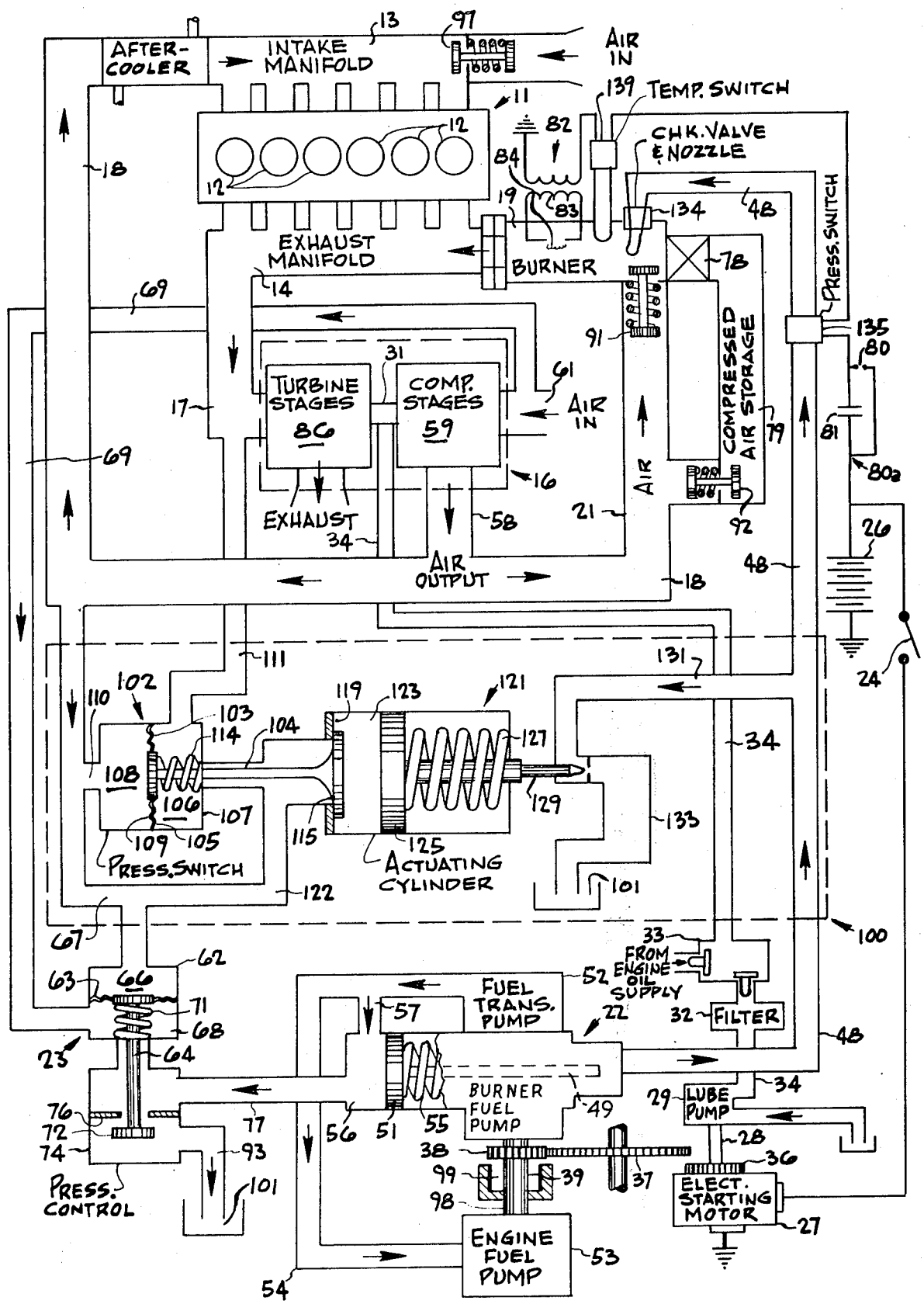
FIG. 1 is a schematic illustration of a diesel engine and gas turbine engine means for controlling same along with means for automatically activating a spark igniter in a gas burner chamber communicating with the exhaust manifold thereof.

Referring to FIG. 1, a diesel engine generally indicated at 11 receives air for combustion in chambers 12 from intake manifold 13. The exhaust gases from chambers 12 are delivered to exhaust manifold 14 from which they flow through passage 17 to drive a turbocharger 16. The compressed air output from turbocharger 16 is delivered through passage 18 to intake manifold 13, thereby furnishing larger quantities of air to the intake manifold 13 than could be obtained at atmospheric pressure. The compressed air from turbocharger 16 is also delivered to a supplemental combustion chamber 19, hereinafter referred to as burner 19, through passage 21. Burner 19 heats and expands the air supply from turbocharger 16 before delivering it to exhaust manifold 14 which communicates therewith. In this manner, exhaust manifold 14 is supplied with additional heated gas for driving turbocharger 16. The amount of additional heated gas delivered to exhaust manifold 14 is controlled by the amount of fuel delivered to burner 19 from independent burner fuel pump 22. A pressure sensing control device 23 regulates the fuel delivered to burner 19 from fuel pump 22 and thereby regulates the addition of heated gas to exhaust manifold 14. The regulator 23 operates in a manner which increases fuel to the burner when the amount of exhaust gas from engine 11 to manifold 14 decreases, and reduces fuel to burner 19 when increased exhaust gas from engine 11 is received by exhaust manifold 14. In this way high speed turbocharger operation is maintained at low engine speeds. Thus, the system of the present invention provides a means by which compressed air from a turbocharger 16 is delivered to an intake manifold 13 of a diesel engine 11 in quantities which are consistent with the needs of the engine.

With diesel engine 11 and turbocharger 16 in a non-operating state, the system is activated by closing switch 24 which allows a battery 26 to energize an electric starting motor 27. Rotation of motor shaft 28 operates a lubrication pump 29 which supplies the necessary lubricant to turbocharger shaft 31 and bearings associated therewith through lubrication filter 32 and a junction valve 33. Lube pump 29, filter 32, valve juncture 33 and turbocharger shaft 31 are all connected by means of lubrication piping 34. The rotation of electric starting motor shaft 28 also induces a Bendix-type gear 36 to mesh with an intermediate gear 37, which in turn meshes with burner fuel pump 38 causing rotation of burner fuel pump shaft 39.

Referring again to FIG. 1, a spring loaded piston 51 is connected to the rack bar of fuel pump 22 to control the quantity of fuel metered into line 48 per stroke of the fuel pump. Shaft 39 which operates burner fuel pump 22 also operates a fuel transfer pump 52. Fuel transfer pump 52 supplies pressure to engine fuel pump 53 through line 54, burner fuel pump 22, and cylinder 56 through a line 57. The pressure in cylinder chamber 56 counteracts the force of a spring 55 to position piston 51. By controlling the pressure in cylinder chamber 56 the position of piston 51 is controlled, which in turn controls the amount of fuel metered to line 48. Since the fuel delivered to line 48 is introduced into burner 19, as explained hereinafter, the rate at which additional heated gas is introduced into exhaust manifold 14 is dependant upon the position of piston 51.

Until turbocharger 16 is set into motion, the pressure at the passageway 58 from its compressor 59 is approximately equal to the pressure at the intake passageway 61 thereof. A housing 62 forming part of the pressure sensing device 23 is divided into two compartments by a diaphragm 63 connected with a valve stem 64. The upper chamber 66 of housing 62 communicates with passageway 18 by means of a line 67, while the lower chamber 68 communicates with intake line 61 to compressor 59 by means of a line 69. Since the pressure in lines 18 and 61 are equal prior to operation of turbocharger 16, valve stem 64 will be in a position determined only by an opposing spring 71. Stem 64 carries a valve 72 in a valve housing 74 and the spring 71 biases the valve toward the closed position against a seat 76.

Valve housing 74 communicates pneumatically with cylinder 56 by means of a line 77. Thus, operation of fuel transfer pump 52 while turbocharger 16 is not operating will cause a build-up of pressure in cylinder 56 as long as valve 72 remains seated. This pressure urges the piston 51 and a rack bar 49 toward a position of maximum fuel delivery from pump 22 to burner 19. This condition is highly desirable since all of the expanding gas to operate turbocharger 16 must come from burner 19 until engine 11 is started.

With maximum fuel being supplied to burner 19 in a manner controlled as explained below, a valve 78 separating burner 19 from a storage tank 79 containing compressed air is opened to allow air to mix with the fuel from line 48 so as to form a combustible mixture. As is also explained below, electrical energy is supplied responsive to pressure in line 48 to allow electrical energy from battery 26 to energize an electrical circuit comprising a capacitor 81, breaker points 80 which form an interrupter type circuit 80a with capacitor 81, and transformer 82. A secondary coil 83 of the transformer 82 extends into the burner 19 and has a spark gap 84 formed therein. The combination of interrupter 80a and transformer 82 provides a circuit which produces sparks across gaps 84 to initiate combustion in a manner explained in detail below.

The expanded gases which result from the combustion in burner 19 enter exhaust manifold 14. The gases in exhaust manifold 14 travel through passageway 17 and into the turbine stages 86 of turbocharger 16 causing rotation thereof which is transmitted to the compression stage 59 through shaft 31. A check valve 91 prevents the full flow of compressed air in passageway 21 from entering burner 19 until a predetermined pressure head has been established which completely opens the check valve 91. When check valve 91 is completely open a complete turbine cycle is established and air from storage tank 79 is no longer necessary. Accordingly, valve 78 between burner 19 and air storage tank 79 is closed and the air utilized to start burner 19 is replenished through a check valve 92 which remains opened until a predetermined pressure is achieved in the tank. Check valve 92 will close when a sufficient pressure is built up in storage tank 79 to allow subsequent starting of the turbine cycle. As pressure builds up in passageway 18 due to increased turbocharger operation, a pressure differential will exist across diaphragm 63 of pressure sensing device 23. When a predetermined pressure differential is attained, valve 72 will unseat allowing the pressure in valve housing 74 to escape through outlet 93. This decreases the pressure in chamber 56 permitting the spring 55 to return the piston 56 and rack bar toward low fuel position. This decreases the amount of gas delivered to manifold 14 from burner 19 which, correspondingly, reduces the operating speed of turbocharger 16. Turbocharger 16 will reach and maintain an equilibrium speed until a variation in pressure is sensed by the sensing device 23.

At this stage of operation (engine 11 shut down), turbocharger 16 and the control system attendant thereto is capable of furnishing a supply of compressed air for operating auxiliary equipment. A pneumatically operated system could be energized by communicating with passageway 21, passageway 18, or other such suitable locations. The pressure of the air supplied by turbocharger 16 is determined by the resilience of spring 71 which can be made variable by conventional means. A drop in pressure in passageway 21 due to the operation of a pneumatic system connected thereto (not shown) would result in reduced pressure in chamber 66 of pressure sensing device 23 which, in turn, would cause valve 72 to seat. Seating of valve 72 would result in additional fuel being metered to burner 19, as described, to increase the speed of operation of turbocharger 16, which would re-establish the predetermined pressure in passageway 21. In a like manner, the existence of a pressure in passageway 21 above a predetermined value would be corrected through the action of the sensing device. Thus, the present invention is seen to include an automatically adjusting system for supplying compressed air at a desired pressure.

When turbocharger 16 reaches the stage of operation at which it supplies its own source of compressed air to burner 19, diesel engine 11 is started. The pressure in passageway 18 will quickly build up since the engine 11 working under no load conditions will rapidly build up speed and drive turbocharger 16 at an increased speed. This build up of pressure in passageway 18 induces pressure sensing device 23 to regulate burner fuel pump 22 to reduce the amount of fuel delivered to burner 19. When engine 11 is called upon to operate under high load conditions the speed of the engine decreases with a resulting decrease in exhaust gases through passageway 17, which in turn results in decreased speed of operation of turbocharger 16. Decreased speed of operation of turbocharger 16 results in a pressure drop in passageway 18 which results in additional fuel being metered to burner 19 though fuel line 48. The additional fuel in burner 19 allows greater heating of the gases passing therethrough and furnishes the necessary additional gases to operate turbocharger 16 at an increased speed thus supplying greater quantities of compressed air to intake manifold 13 through passageway 18. Since engine 11 is operating under high load conditions and demanding a greater supply of fuel, the additional air is required to support combustion of the fuel.

When engine 11 goes from a high load to a low load condition, the air requirement to intake manifold 13 decreases. Under these conditions the speed of the engine increases which is reflected in the speed and output of the turbocharger and increased pressure in passageway 18 which, in turn, results in reducing fuel supply to burner 19, as described supra. The decreased fuel to burner 19 results in less contribution of gases from burner 19, which in turn is responsible for reducing the speed of turbocharger 16. Intake manifold 13 is then supplied with only the necessary compressed air to maintain operation of the engine under low load. A check valve 97 separates intake manifold 13 from the atmosphere and insures that the air pressure in intake manifold 13 never drops below atmospheric pressure.

The turbocharger system for an internal combustion engine as described in detail up to this point is old in the art, and is taught in more detail in U.S. Pat. No. 3,096,615 which is hereby referred to and incorporated herein by reference thereto.

Means are provided in accordance with the present invention, most particularly the selective shunting means 100 for selectively shunting fuel from the fuel supplying means or pump 22 and more particularly from the line 48 to the fuel reservoir 101 responsive to a ratio of pressure in the intake manifold 13 to pressure in the exhaust manifold 14 exceeding a selectively set value determined as explained in following. A pressure sensing regulator 102 is provided which is divided into two compartments by a diaphragm 103 to which is connected a valve stem 104. The valve stem 104 proceeds from a first side 105 of the diaphragm 103. Thereby a first chamber 106 is formed between the first side 105 of the diaphragm 103 and the casing 107. Similarly, a second chamber 108 is formed by the second side 109 of the diaphragm 103 and by the casing 107. The second chamber 108 communicates with passage 18 through the line 67 by means of a conduit 110. The first chamber 106 communicates with passage 17 by way of conduit 111. The pressure in passages 17 and 18 is equal prior to start up of the engine 11 and operation of the turbocharger 16. At this time, valve stem 104 is in a position determined only by the strength of an opposing spring 114 which biases a valve 115, carried by the valve stem 104 toward a closed position against a seat 119 at one end of a cylinder 121. As pressure is prevented from entering a chamber 123 within the cylinder 121 from a conduit 122 which communicates with the passage 18 while valve 115 is closed, a piston 125 within the cylinder 21 is baised towards the valve seat 119 and the valve 115 by a spring 127, thereby allowing a needle valve 129 to unseat whereby fuel which is being pumped by the pump 22 into the line 48 is allowed to escape back to the fuel reservoir 101 via a line 131 and a line 133. This thereby prevents build-up of pressure in the line 48. Back up of pressure from the burner 19 into the line 48 is prevented by a check valve 134 in said line 48. Without sufficient pressure, fuel is also prevented from entering the burner 19 by means of the check valve 134. A pressure activated electrical switch 135 which thereby serves to prevent supply of fuel to the burner unless the fuel is at a fuel pressure above a selectively set minimum value as determined by the setting of the pressure activated electrical switch 135 and which ignites the burner 19 via the circuit 80a when the fuel pressure exceeds a selectively set minimum value.

After the engine 11 is started, exhaust pressure in the exhaust manifold 14 turns the turbine 86 which in turn rotates the compressor 59 by means of the shaft 31. The check valve 91 prevents a full flow of compressed air in passageway 21 from entering the burner 19 until a predetermined pressure head has been established which completely opens the check valve 91. when the pressure in passage 18 becomes greater than the pressure in passage 17, which corresponds to pressure in the intake manifold 13 becoming greater than pressure in the exhaust manifold 14 by the selectively set (by spring 14) ratio, the pressure differential in the pressure sensing regulator 102 causes the diaphragm 103 to unseat the valve 115. This allows pressure in conduit 122, which corresponds to the pressure in passage 18, to enter the chamber 123 of the cylinder 121. The pressure in the chamber 123 then acts to move the piston 125 away from the valve 115 and the valve seat 119 thereby causing the needle valve 129 to seat and prevent fuel from traveling from line 48 and thence through lines 131 and 133 to the fuel reservoir 101. This allows pressure to build up in the line 48, which pressure causes the spark activating means, in the embodiments illustrated, the pressure activated electrical switch 135, to turn on the spark igniter 82 by passage of current from battery 26 serially through a temperature responsive deactivating means, in the embodiment illustrated the temperature switch 139, to the spark igniter 82. A spark is thus created across the gap 84 to initiate combustion within the burner 19. After ignition, the temperature switch 139, which is in series with the pressure activated electrical switch 135, serves to break the contact to the spark igniter 82. Thereby, as can be seen, the present invention provides means for automatically igniting the burner 19 when the engine 11 is started and means for shutting off sparking after start up.

Although the specific embodiment of the present invention has been described above with reference to a diesel engine, operation of the system of the present invention is not limited thereto. Any internal combustion engine utilizing a turbocharger can advantageously utilize the present invention by providing a pump to deliver pressure to piston chamber 56 where a fuel transfer pump is not inherent in the engine. This pump could be the engine lubricating oil pump or an auxiliary one. Piston 51 instead of controlling the position of the rack bar 49 could act to control a governor operated throttle to respond to movement of piston 51 in the same manner that the rack bar 49 does in the embodiment described. The remaining components of the system of the present invention would be essentially identical.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In a turbocharger system for an internal combustion engine having an exhaust manifold and an intake manifold adjacent to the engine, a turbine communicating with the exhaust manifold and driven by gases therefrom, a compressor driven by said turbine and having an output which communicates with said intake manifold, a fuel burner chamber having an input for receiving compressed air, a spark igniter, and an output through which expanded gases pass, means communicating the output of said compressor to the input of said fuel burner chamber, means communicating the output of said fuel burner chamber into and through the exhaust manifold, means for supplying a variable quantity of fuel from a fuel reservoir to said burner chamber and means responsive to intake manifold pressure to vary the quantity of fuel delivered to said burner, an improvement comprising:

means for preventing supply of said variable quantity of fuel to said burner unless said fuel is at a fuel pressure above the pressure in said burner; and means responsive to said fuel being at least equal to a selectively set minimum fuel pressure value for activating said spark igniter in said burner chamber.

2. An improvement as in claim 1, including:

means responsive to a ratio of intake manifold pressure to exhaust manifold pressure exceeding a selectively set ratio for selectively shunting fuel from said fuel supplying means to said reservoir only until said ratio is at least equal to said selectively set ratio value.

3. An improvement as in claim 2, including:

means responsive to temperature of said burner chamber for deactivating said spark igniter when said temperature is at least equal to a selectably set minimum temperature value.

4. An improvement as in claim 3, wherein said fuel supply preventing means comprises check valve means and said means for activating said spark igniter comprises pressure switch means.

5. An improvement as in claim 4, wherein said fuel selective shunting means comprises conduit means from said fuel supply means to said fuel reservoir and valve means for closing said conduit means, said valve means remaining closed only until a differential pressure comprising the pressure of said intake manifold minus the pressure of said exhaust manifold is at least equal to a selectably set minimum differential pressure value.

6. An improvement as in claim 5, wherein said valve means comprises a diaphragm operated valve.

7. An improvement as in claim 6, wherein said spark igniter deactivating means comprises temperature switch means.

* * * * *